No. 752,000. PATENTED FEB. 9, 1904.
C. E. & J. W. SAYRE.
BLOWER FOR GAS MACHINES.
APPLICATION FILED JUNE 6, 1902.
NO MODEL.

WITNESSES:
Geo. R. Turner
M. E. Kennedy

INVENTORS
Charles E. Sayre and
James W. Sayre,
By G. C. Kennedy,
ATTORNEY

No. 752,000.

Patented February 9, 1904.

UNITED STATES PATENT OFFICE.

CHARLES E. SAYRE, OF WATERLOO, AND JAMES W. SAYRE, OF HARTLEY, IOWA.

BLOWER FOR GAS-MACHINES.

SPECIFICATION forming part of Letters Patent No. 752,000, dated February 9, 1904.

Application filed June 6, 1902. Serial No. 110,424. (No model.)

*To all whom it may concern:*

Be it known that we, CHARLES E. SAYRE, residing at Waterloo, Blackhawk county, and JAMES W. SAYRE, residing at Hartley, O'Brien county, State of Iowa, citizens of the United States, have invented certain new and useful Improvements in Blowers for Gas-Machines, of which the following is a specification.

Our invention relates to improvements in blowers; and the particular object of our improvement is to provide a rotatable blower and compressor whose communicating chambers are so arranged as to furnish a current of air for any purpose at a uniform and automatically-regulated pressure.

Rotatable blowers which have heretofore been constructed for the purpose of furnishing a current of compressed air have had no governing means for automatically keeping the air in the compressing-chambers and in the supply chamber or reservoir of the blower at an approximately equal pressure. The result has been that when a rotatable blower was used fluctuations of pressure occurred in the reservoir-compartment of the blower, due to the intermittent supply, and a consequent variation in the pressure of the air-current furnished. This result is obviated by placing regulating means between the compressing-chambers and the supply-reservoir of the blower.

Our invention therefore consists, essentially, of a drum containing concentric chambers, communicating through its outer circumference with the air under atmospheric pressure and through the shell of its inner chamber with the reservoir for compressed air and having a series of openings within its inner shell so arranged as to allow of an automatic equalization of pressure between the air in the compression-chamber and the axial reservoir-chamber.

We therefore declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
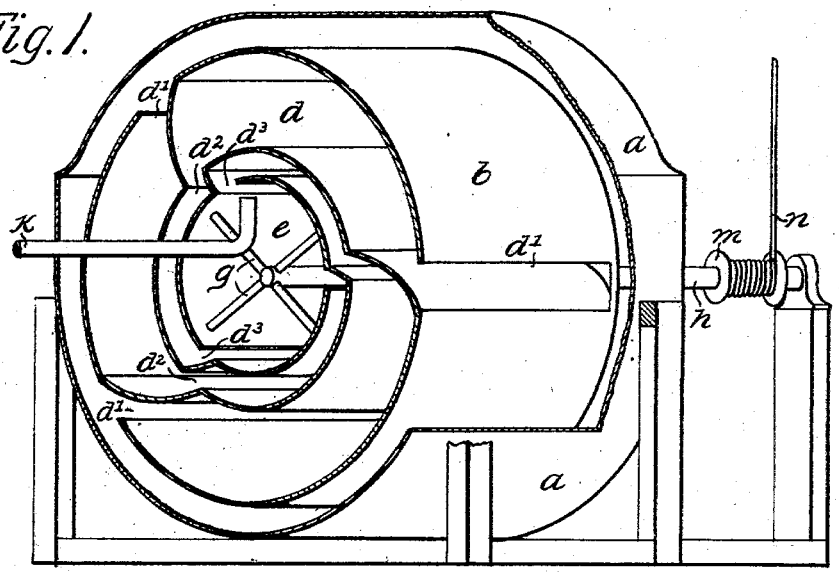
Figure 2:
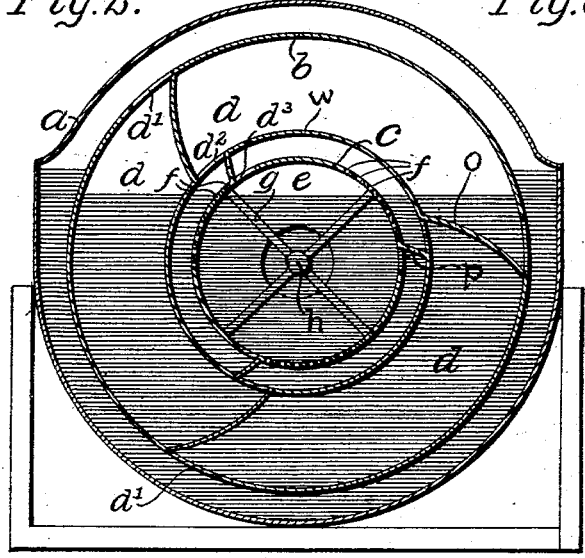
Figure 3:
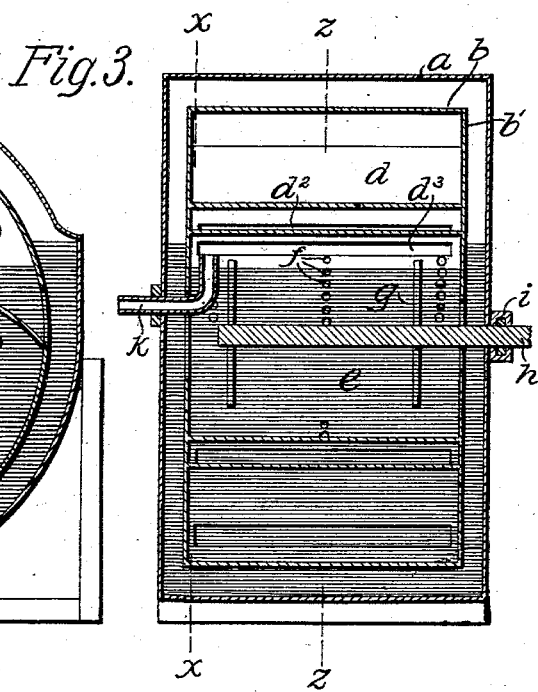

Figure 1 is a perspective view showing the surrounding tank partially sectioned away and the rotatable blower sectioned transversely on the line $x\ x$ of Fig. 3. Fig. 2 is a transverse vertical section on the line $z\ z$ of Fig. 3, and Fig. 3 is a longitudinal vertical section.

The blower is contained within a tank $a$, the latter being nearly filled with water. The blower is composed of two concentric cylinders $b$ and $c$, the space between which is divided into three compartments $d$ by means of substantially radial diaphragm-plates $o$. These compartments communicate with the outer air through openings $d'$ and with the axial reservoir-chamber $e$ by means of openings $d^3$. Each compartment is an independent compression-chamber formed in two portions, the outer and larger portion communicating with the inner and smaller portion through an opening $d^2$, formed in a circular wall $w$ concentric with and fixed between the cylinders $b$ and $c$. Said opening $d^2$ stands between an outer diaphragm-plate $o$ (connecting the wall $w$ with the outer cylinder $b$) and a similar inner diaphragm-plate $p$, (connecting the wall with the inner cylinder $c$,) and hence the opening connects one end of the outer portion of a compartment with the opposite end of its inner portion. Each compartment, including both its portions, extends two-thirds of the distance around the cylinder. The inner cylinder $c$ is provided with openings $f$, arranged in three groups or series, located, respectively, near the inner point of junction of the inner cylinder with the diaphragms of the compression-chambers opposite the openings $d^2$, but on the other side of the diaphragms $o$ from the openings $d^3$. These openings $f$ afford a means of communication between each of the chambers, respectively, and the inner reservoir $e$. The inner cylinder $c$ is connected, by means of the spokes $g$, to a shaft $h$. One end of the shaft $h$ protrudes through the blower-shell and the stuffing-box $i$ on the tank $a$ and is provided with a spool $m$ and cord $n$.

The blower may be rotated by means of weights attached to the cord $n$ or in any other desired manner.

Each end of the blower-cylinder $b$ is covered by a plate $b'$, having openings about the axis to allow free circulation of the water from the tank to the interior of the blower.

$k$ is a pipe having its inner end introduced within the interior chamber $e$ of the blower and is intended to convey away the compressed air from said chamber to any desired place where it is to be used. The inner end of said pipe $k$ is bent upwardly at right angles that its inlet-opening may always be above the water in the chamber $e$.

The operation of the device is as follows: The tank $a$ having been nearly filled with water, which passes into the blower through the openings $d'$, and thence into the reservoir $e$ through the openings $d^2$, $d^3$, and $f$, the blower $b$ is put into rotation. As each outer opening $d'$ passes below the surface of the liquid in the tank $a$ said opening is sealed, and the water passing within the compression-chamber $d$ compresses the air therein. The further rotation of the blower brings each of the openings $f$ successively above the surface of the water in the reservoir $e$, affording opportunity for increasing quantities of the compressed air in the chamber $d$ to pass into the reservoir $e$ as more and more of the openings $f$ are exposed. The air in the reservoir $e$ is thus gradually compressed until the further rotation of the blower brings the inner opening $d^3$ above the water-level and the air in the chamber $d$ is blown into the chamber $e$. Immediately another series of openings $f$ are exposed communicating with the next chamber $d$ and the compressed air in the latter, automatically regulating the uniformity of pressure in the compartment $d$ and the chamber $e$. The compressed air thus stored in the inner chamber $e$ is drawn off as needed through the outlet-pipe $k$. The arrangement of the compression-chamber $d$ so that it extends two-thirds of the distance around the blower always keeps the inner opening $d^3$ sealed when the opening $d'$ is taking in air under atmospheric pressure and keeps the opening $d'$ sealed when the compressed air is exhausting into the inner chamber $e$. A maximum of compression is thereby secured, and the action is always certain. The regulating action of the openings $f$ between the compression-chambers $d$ and the inner chamber $e$ therefore, as stated, equalizes the pressure in both and prevents fluctuation in the current of air passing out through the pipe $k$. This sureness of action in governing of the pressure renders the blower especially available for the purpose of furnishing air under constant pressure to the carbureters of gas-machines.

We concede that rotary blowers which draw air from without and exhaust it into reservoir-chambers are old, and therefore do not claim the same broadly.

Having described our invention, what we claim as new, and desire to secure by Letters Patent, is—

1. A blower consisting of a fixed water-tank, a rotary drum therein comprising outer and inner concentric cylinders and an interposed concentric wall dividing the space between the cylinders into outer and inner portions, substantially radial diaphragm-plates of equal number in both portions but non-alined, openings through the wall between adjacent plates connecting the rear end of each outer portion with the forward end of one inner portion, air-inlets through the outer cylinder at the forward end of each outer portion, air-outlets through the inner cylinder at the rear end of each inner portion, and an air-exhaust from the interior of said inner cylinder.

2. A blower consisting of a fixed water-tank, a rotary drum therein comprising outer and inner concentric cylinders and an interposed concentric wall dividing the space between the cylinders into outer and inner portions, substantially radial diaphragm-plates of equal number in both portions but non-alined, openings through the wall between adjacent plates connecting the rear end of each outer portion with the forward end of one inner portion, air-inlets through the outer cylinder at the forward end of each outer portion, air-outlets through the inner cylinder at the rear end of each inner portion, a series of additional air-outlets at the front end of each inner portion, and an air-exhaust from the interior of said inner cylinder.

3. A blower consisting of a fixed water-tank, a rotary drum therein comprising outer and inner concentric cylinders and an interposed concentric wall dividing the space between the cylinders into outer and inner portions, substantially radial diaphragm-plates of equal number in both portions but non-alined, openings through the wall between adjacent plates connecting the rear end of each outer portion with the forward end of one inner portion, air-inlets through the outer cylinder opening into each outer portion, two sets of air-outlets opening from each inner portion through the inner cylinder, and an air-exhaust from within the latter.

4. A blower consisting of a fixed water-tank, a rotary drum therein comprising outer and inner concentric cylinders and an interposed concentric wall dividing the space between the cylinders into larger outer and smaller inner portions, diaphragm-plates of equal number in both portions but non-alined, openings through the wall between adjacent plates connecting the rear end of each larger outer portion with the forward end of one smaller inner portion, air-inlets into the larger portions, air-outlets from the smaller, and an air-exhaust from the interior of the inner cylinder.

5. A blower consisting of a fixed water-tank, a rotary drum therein comprising outer and inner concentric cylinders and an interposed concentric wall dividing the space between the cylinders into larger outer and smaller inner portions, diaphragm-plates of equal number in both portions but non-alined, openings through the wall between adjacent plates connecting the rear end of each larger outer portion with the forward end of one smaller inner portion, air-inlets into the larger portions, air-outlets from the smaller, including a series of openings, through the inner cylinder for each portion, and an air-exhaust from the interior of the inner cylinder.

6. A blower consisting of a rotary drum comprising concentric cylinders and radial diaphragms, and a circular wall therein dividing the drum into compression-chambers, each having a larger outer portion extending one-third around the axis and then communicating with a smaller inner portion extending a second third around it; combined with air-inlets into the larger portions and air-outlets from the smaller, and a liquid seal in which the drum is submerged for substantially two-thirds its upright diameter, the whole operating as set forth.

In testimony whereof we affix our signatures in presence of two witnesses.

CHARLES E. SAYRE.
JAMES W. SAYRE.

Witnesses:
J. F. ALBRECHT,
C. M. JENSEN.